United States Patent [19]

Weston

[11] Patent Number: 4,572,298

[45] Date of Patent: Feb. 25, 1986

[54] GATE VALVE APPARATUS AND METHOD

[75] Inventor: Harry Weston, Warnam, United Kingdom

[73] Assignee: Hydril Company, Los Angeles, Calif.

[21] Appl. No.: 549,255

[22] Filed: Nov. 4, 1983

[30] Foreign Application Priority Data

Nov. 5, 1982 [GB] United Kingdom ............... 8231601
Nov. 11, 1982 [GB] United Kingdom ............... 8232226
Dec. 20, 1982 [GB] United Kingdom ............... 8236158
May 20, 1983 [GB] United Kingdom ............... 8313970

[51] Int. Cl.$^4$ ............................................. E21B 34/02
[52] U.S. Cl. ..................................... 166/379; 166/95;
166/97; 166/316; 166/320; 166/386;
137/625.48; 251/327; 251/329
[58] Field of Search .................. 166/75 R, 76, 77, 80,
166/86, 95, 97, 316, 320, 330, 332, 373, 379,
378, 381, 386, 374; 251/327, 329; 137/625.48

[56] References Cited

U.S. PATENT DOCUMENTS

| 267,903 | 11/1882 | Lanagan | 166/95 |
| 1,721,884 | 7/1929 | Roberton | 166/97 |
| 2,150,887 | 3/1939 | Mueller et al. | 166/379 |
| 3,016,955 | 1/1962 | Magill et al. | 166/373 |
| 3,020,927 | 2/1962 | McLaughlin | 137/625.48 |
| 3,933,165 | 1/1976 | Budzak et al. | 137/625.48 |
| 4,423,741 | 1/1984 | Levy | 137/625.48 |

FOREIGN PATENT DOCUMENTS

| 0039885 | 3/1983 | Japan | 251/327 |
| 0429211 | 10/1974 | U.S.S.R. | 137/625.48 |
| 0692978 | 10/1979 | U.S.S.R. | 251/327 |

Primary Examiner—James A. Leppink
Assistant Examiner—Hoang C. Dang
Attorney, Agent, or Firm—Dodge, Bush & Moseley

[57] ABSTRACT

Safety equipment for land or marine well completions is disclosed. In one embodiment of the invention a gate valve is provided in which the gate has a removable insert so that in one position of the valve, the insert can be removed (or inserted) via an upper vertical passage of the valve to provide full-bore access via an attached blowout preventer stack to the well head below.

In another embodiment of the invention a gate valve is provided having at least two vertical passages through the gate. The first is large enough to provide full-bore access via an upper passage in the housing of the valve. The second is of a smaller diameter to provide vertical communication with tubing disposed in a lower vertical passage and in an upper vertical passage.

Either of the above embodiments may be used in a lateral production tree where the gate is provided with an "L" or "T" shaped passage in another lateral portion of the gate and lateral outlets are provided in the valve housing.

This abstract of the disclosure is neither intended to define the scope of the invention, which is measured by the claims, nor is it intended to limit the invention in any way.

44 Claims, 16 Drawing Figures

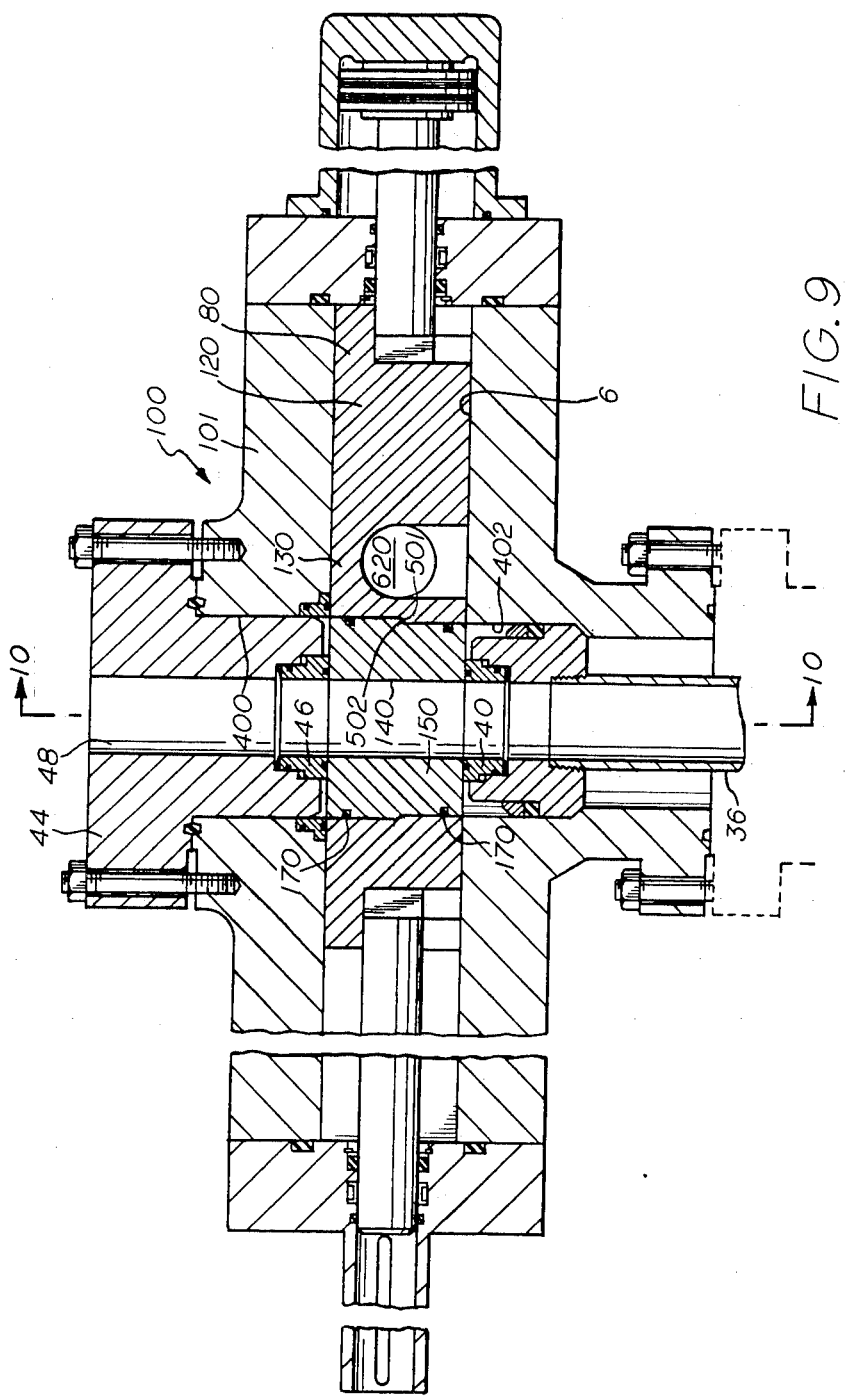

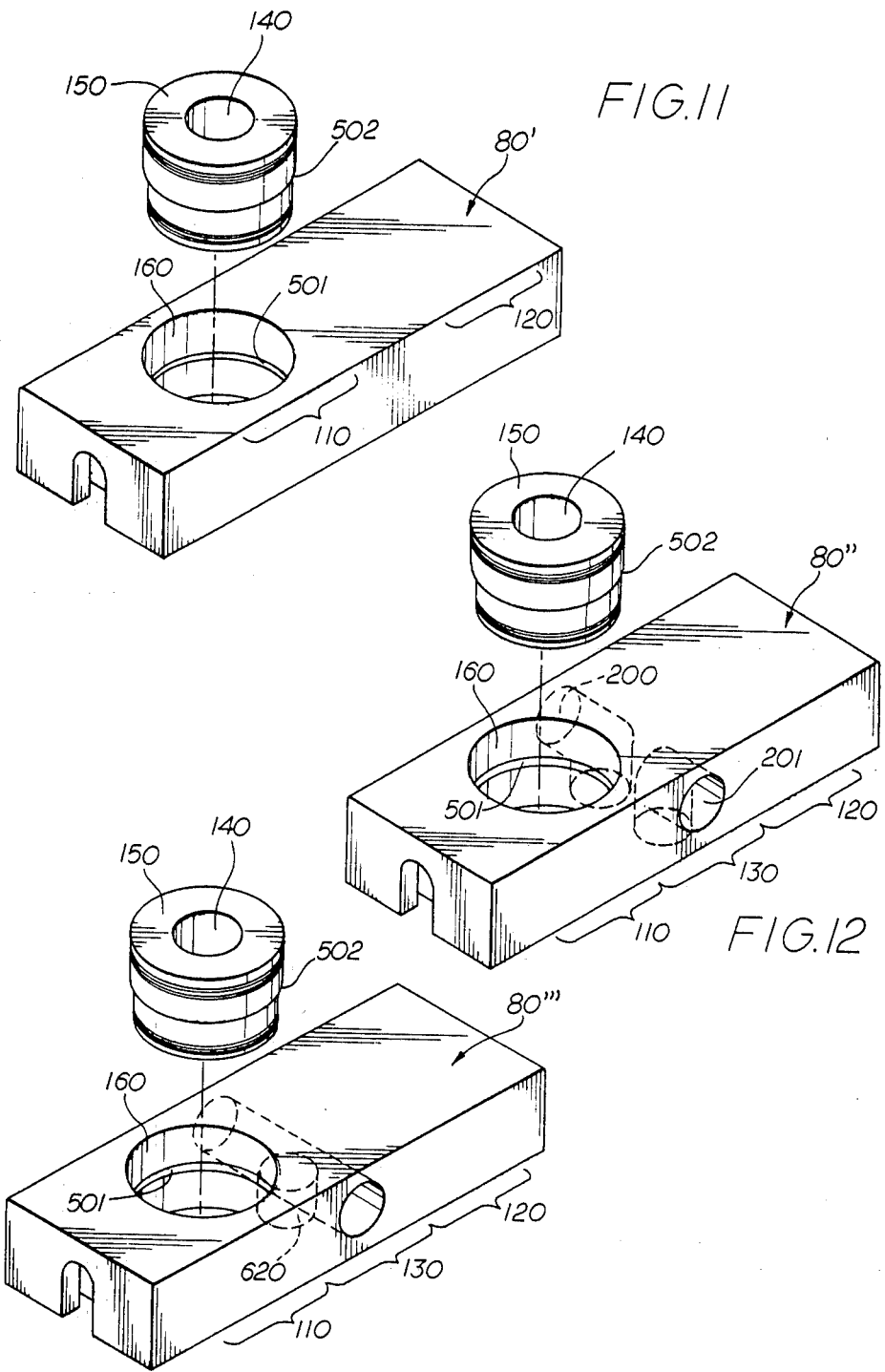

GATE VALVE APPARATUS AND METHOD

BACKGROUND OF THE INVENTION

1. Field of the Invention

The invention generally relates to a valve which may be used as a master valve for a production well, or alternatively as a safety or blowout preventer valve between a tubing head and a production (Christmas) tree. The invention also generally relates to valve apparatus providing complete control over a well during installation or workover of tubing in an oil or gas well.

More specifically, the invention, in its blowout preventer embodiment, is directed for use on offshore production platforms where a plurality of producing oil wells are disposed in close proximity to one another and where there is an emergency need to simultaneously shut in all the producing wells rapidly, safety, reliably, and economically while facilitating rapid resumption of production after the emergency has passed.

The invention may also serve as a substitute for a master valve in production wells where a vertical production tree is eliminated in favor of horizontal plane apparatus.

2. Description of the Prior Art

On marine production platforms there are often many producing wells in close proximity to one another. Each of the wells typically has a production wellhead from which production tubing extends from the well. The wellhead typically has a production or "Christmas" tree connected to it for controlling the gas or fluid flowing in the production tubing during production of the well. A master gate valve disposed in each production tree may be closed to shut off flow from the well, but such gate valves may be difficult to close rapidly during an emergency due to their location, and indeed may not be available as where the production tree is removed from the wellhead during workover of the well.

Downhole saftey valves may also be provided in each of the producing wells; but there is always the danger that a downhole safety valve may not be operable or in place during workover of the well. As indicated above, during workover, the production tree may have been removed in order to install a blowout preventer stack atop the production wellhead for control of the well during workover. Such a blowout preventer stack is of the kind used typically in drilling operations and includes one or more ram-type blowout preventers and an annular blowout preventer. Until the blowout preventer is installed on the production wellhead and connected to its controls, well control in the past for the well has depended upon remotely installed plugs in the well. Such plugs have not always been reliable.

During an emergency on an offshore platform, for example, where a fire or leaking gas or fluid from one production tree endangers all of the wells and indeed the platform itself, there has developed the need for an apparatus and method for its installation and refurbishing which may be used to rapidly close off the flow path of the production tubing in each of the wells.

As indicated above, a shear ram blowout preventer similar to those used in marine blowout preventer stacks for drilling operations could be a candidate for satisfying such a need. The use of a shear ram blowout preventer has a major disadvantage in that the tubing above the tubing hanger must be replaced after it has been sheared before production can be resumed. Shear ram blowout preventers crush the production tubing which must be replaced before the well can be put back into operation. In order to replace the crushed tubing, the production tree must be removed and a drilling blowout preventer and rig installed in order to remove the damaged tubing and replace it with new tubing.

Another disadvantage of using a shear ram blowout preventer similar to that used in drilling operations is that after the preventer crushes and shears the tubing, the well can only be controlled by pumping mud into it to control the pressure in the well. A plug typically cannot be installed through the tubing which has been crushed during the shearing by the preventer.

IDENTIFICATION OF OBJECTIVES OF THE INVENTION

Thus, it is an important objective of the invention to provide apparatus intermediate a wellhead and a Christmas tree serving as a safety valve which does not crush the tubing extending into the well.

Another important object of the invention is to provide apparatus for controlling the well during removal of a blowout preventer atop the apparatus and while it is being replaced with a Christmas tree.

Another object of the invention is to provide an apparatus and method for controlling the well at all times, in conjunction with a blowout preventer atop the apparatus, while installing or working over production tubing in the well.

A key objective, in other words, is to provide continuous uninterrupted security for a well to which it is attached from the time prior to running production tubing to the final abandonment of the well.

Another key objective of the invention is to provide apparatus which does not destruct part of the apparatus, and thus provides a safety means for operating personnel to use during operations on the well in which they do not hesitate to use for fear of having to later replace a part during a time consuming procedure. In still other words, it is an objective of the invention to provide a safety valve which is entirely reversable without destruction of tubing or valve parts.

Most Christmas trees are vertically oriented; that is, a master valve is provided in a spool attached to the wellhead. Control valves are then provided laterally from the spool above the master valve. The well is produced and controlled through the control valves.

Some wells demand that the vertical height of the Christmas tree be minimized. For example, in a shallow subsea completion, it is desirable to minimize the height of the tree so that vessels passing above will not contact the tree during extremely low tide conditions. Another example is where the tree height must be minimized for esthetic reasons, say in a city.

Thus, another important objective of the invention is to provide an apparatus which may serve as a master valve of a production tree where control valves may be disposed at the same height as that of the master valve.

SUMMARY OF THE INVENTION

The general objects of the invention as outlined above are provided, as well as other important features and advantages of the invention, are described in the summary of the invention which follows. A more specific object of the invention is to provide a producing well safety valve in which no element is replaced and in which the production tubing is not disturbed after the valve has been closed and which does not require that the production tree be removed after the valve has been closed.

Another object of the invention is to provide a safety valve in a producing well which can be immediately put back into production after the valve has been closed.

Another object of the invention is to provide a safety valve for use in a producing well in which access to the production tubing is available via a blowout preventer attached to its top.

Another object of the invention is to provide valve apparatus which enables the production tubing to be connected directly to a lateral valve line.

Yet another object of the invention is to provide apparatus useful during loss of control over the well to regain control over the well by lateral access to the production tubing in order to carry out any of a wide range of procedures such as circulation, bullheading, pressure relieving, killing, etc., prior to vertical re-entry of the well.

It is still another object of the invention to provide an apparatus and method for controlling the well during completion of the tubing into the well or during workover at the time that the blowout preventer stack is removed in order to install the Christmas tree or vice versa.

It is another object of the invention to provide complete control over the well during wireline operations at any stage of the operations in a production well.

According to the invention, a safety valve is provided which is adapted for placement above a wellhead. The housing of the valve has coaxial upper and lower vertical housing passages. The diameter of the upper and lower passages are sufficiently large to pass a tubing hanger with tubing or the like for landing in the wellhead. A control element means is provided for placement between the upper and lower vertical housing passages for preventing or allowing fluid through a passage smaller than the lower vertical housing passage and for providing full diametrical access via the upper housing passage to the lower housing passage.

The control element preferably is a gate for controlling flow in one or more tubing strings disposed in the wellhead below the valve. It may be connected to a lateral outlet and valve line via the gate.

According to another aspect of the invention, a wellhead is provided having an integral or a separate housing, with a diverter valve, for example, a gate valve, which has a removable insert such that in one position of the valve, the insert can be removed via a vertical housing passage to provide full bore access to the wellhead housing.

According to another aspect of the invention, the gate of the gate valve has multiple positions wherein in a first position the gate has a vertical passage having a diameter substantially the same as or less than the upper vertical passage and a second lateral portion with a second gate vertical passage having a diameter smaller than the first gate vertical passage. The second gate vertical passage is preferably sized to cooperate with tubing landed in the wellhead below the valve housing. Preferably, a third lateral portion is provided in the gate having an "L" shaped passage or a "T" shaped passage having an opening in the bottom of the gate to cooperate with tubing landed in the wellhead below and one or two openings in the side portions of the gate to cooperate with a lateral opening or openings in the valve housing.

According to one embodiment of the invention a hydraulically or manually operated gate valve is provided which may be incorporated in the same forging or casting as the wellhead or in a separate valve housing which may be secured to the wellhead. A means for landing a tubing hanger is provided within the valve housing or in the wellhead to which the valve housing may be attached. An adapter or coupling means is provided for sealing flow continuity with the tubing in the tubing hanger. In the first embodiment of the invention, the valve gate has a diverter section with a bore diameter corresponding to that of the tubing landed in the wellhead. The bore in the diverter portion of the gate can provide communication vertically in line with the well or laterally.

In a second embodiment of the invention, the valve gate has a vertical cavity in which is placed a removable insert having a vertical bore within it. The insert includes a stepped external profile to locate it in a stepped opening in the vertical cavity of the gate. This latter stepped opening has an internal diameter at least as large as the internal diameter of the lower vertical passage of the valve and of the wellhead.

According to the invention, the insert for the vertical gate cavity may be removed when the gate is in a position with the insert in line with the tubing head. When the insert has been removed, the tubing hanger may pass through the enlarged bore of the gate thus revealed in the gate. The vertical passage in the insert preferably has a diameter equal to that of the tubing.

In a first embodiment of the invention in which the gate has no insert, a laterally movable gate is disposed in a lateral passage of a housing having a vertical housing passage and a lateral housing passage where the vertical and lateral passages intersect one another. The gate has a first lateral portion with a first gate vertical passage having a diameter substantially the same as or less than the vertical housing passage. A second lateral portion is provided in the gate having no vertical passage therethrough. A third lateral portion is provided with a second gate vertical passage having a diameter smaller than the first gate vertical passage. In this embodiment of the invention, when the gate is in a lateral position where the first gate vertical passage is aligned with the vertical housing passage, full diameter access through the vertical housing passage and the first gate vertical passage is provided.

Means are provided for laterally moving the gate in the lateral housing passage between at least two positions. The first position is where the gate is in a lateral position such that the first gate vertical passage is aligned with the vertical housing passage and full diameter access through the vertical housing and the first gate vertical passage is provided. The second position is where the gate is in a second lateral position such that the second lateral portion of the gate is aligned with the vertical housing passage and the vertical flow path through the vertical housing passage is closed.

Means may be provided for disposing upper and lower tubing members or conduits in the lower and upper vertical housing passages, the upper conduit having its lower end open to the intersecting vertical and lateral passages and the lower conduit having its upper end open to the intersecting vertical and lateral passages. The lateral moving means is further adapted to move the gate among the two positions mentioned above and a third position. The third position is where the gate is in a lateral position such that the second gate vertical passage is aligned with the upper lower end of the upper conduit and the open upper end of the lower conduit.

In the embodiment discussed above, preferably at least one lateral outlet is provided in the housing where the lateral outlet is substantially perpendicular to the vertical housing passage and to the lateral housing passage and is open to the intersection of the lateral housing passage and the vertical housing passage. In this embodiment, the gate has a fourth lateral portion with a gate "L" shaped passage therein having an opening in the bottom of the gate and an opening in the side portion of the gate. The lateral moving means is adapted to move the gate among the three positions mentioned above and a fourth position where the gate is in a lateral position such that the gate "L" shaped passage has its opening in the bottom of the gate aligned with the upper end of the lower conduit in the lower vertical housing passage and its opening in the side portion of the gate aligned with the lateral outlet in the housing.

In the embodiment discussed above, two lateral outlets may be provided in the housing and the gate may include a fourth lateral portion with a "T" shaped passage. The lateral moving means may be adapted to move the gate among the three positions mentioned above and the fourth position where the gate is in a lateral position such that the gate "T" shaped passage communicates with the lower conduit and the openings in the sides of the gate are aligned with respective lateral outlets in the housing. A single diverter valve may be attached to the single lateral outlet for the "L" shaped passage embodiment of the invention or two diverter valves may be connected, one each to the two lateral outlets in the "T" shaped passage embodiment of the invention.

More specifically with respect to the second embodiment of the invention, a valve is provided having a housing with coaxial upper and lower vertical housing passages and a lateral housing passage. The lateral housing passage intersects the upper vertical housing passage and the lower housing passage. A laterally movable gate is disposed in the lateral passage where the gate has a first lateral portion with a first gate vertical insert cavity. The insert cavity has an inner diameter substantially the same as or less than that of the upper vertical housing passage. A removable inner part is provided for placement in or removable from the insert cavity. The inner part has an outer diameter substantially the same as that of the insert cavity and has in addition a vertical passage in it. When the gate insert cavity of a first lateral portion of the gate is aligned with the upper and lower vertical housing passages, the removable inner part of the gate may be removed from or inserted wihin the insert cavity via the upper vertical housing passage.

Preferably, means are provided for laterally moving the gate in the lateral housing passage between at least two positions. The first position is where the vertical passage of the inner part is aligned with the upper and lower vertical housing passages thereby allowing fluid communication between the upper and lower passages of the housing. The second position is where a second lateral portion of the gate having no passage extending through it covers the lower housing passage thereby closing the flow path from the lower passage to the upper passage of the housing. In this second embodiment of the invention, means are provided for disposing upper and lower conduits, respectively, in said upper and lower vertical housing passages. The upper conduit has its lower end open to the intersecting lateral passage. The lower conduit has its open upper end open to the intersecting lateral passage.

In the first position of the gate mentioned above, the inner part disposed in the insert cavity is aligned with the upper and lower conduits allowing fluid communication therebetween. In this second embodiment at least one lateral outlet is preferably provided in the housing. The lateral outlet is substantially perpendicular to the vertical housing passage and to the lateral housing passage and is open to the intersection of the lateral housing passage and the vertical housing passage.

The gate further may have a third lateral portion with a gate "L" shaped passage therein. The "L" shaped passage has an opening in the bottom of the gate and an opening in the side portion of the gate. The lateral moving means is adapted to move the gate among the first and second positions mentioned above and a third position. In the third position, the "L" shaped passage has its opening in the bottom of the gate aligned with the upper end of the lower conduit and its opening in the side of the gate aligned with the lateral outlet in the housing. Two lateral outlets may be provided in the housing and a "T" shaped passage may be provided in the third lateral portion of the gate as described previously with the first embodiment of the invention described previously.

Either of the two embodiments of the invention may be provided having no lateral position that completely covers the tubing. Rather, a portion of the gate may have an "L" shaped or a "T" shaped bore therein for diverting fluid from the tubing in the wellhead below.

According to the invention, either of the embodiments mentioned above may have means for cutting a wireline extending through the upper and lower vertical passages and through a gate vertical passage upon moving the gate away from the position where the gate vertical passage is aligned with the upper and lower vertical passages.

According to the invention, the gate may be laterally moved within the lateral housing passage either by hydraulic or manual means. Preferably the gate is moved manually for non-emergency operations but a hydraulic actuator is provided for emergency purposes to drive the gate to a full off or a divert position.

Although the embodiments described above may be used as a safety valve between a tubing or wellhead and a blowout preventer stack or Christmas tree it may also be advantageously used as a production tree where the valve, according to the invention, may be used as the master valve of a tree and diverter valves connected with lateral outlets in the housing may serve as control valves of the tree.

According to the invention, a method is provided using the apparatus described above for controlling a well during installation of production tubing and a Christmas tree in a well in production or during completion of a well for production. Tubing in the well is set through a blowout preventer in the upper passage of the safety valve, the insert cavity of the gate, and the lower passage of the safety valve housing. Next, an inner part of the gate is installed within the vertical insert cavity from the first lateral portion of the gate where the inner part has an outer diameter substantially the same as that of the insert cavity of the first lateral portion. Next, the gate is laterally moved within the safety valve housing until flow from the tubing is prevented access to the upper passage of the housing. The blowout preventer is then removed from the upper part of the housing and a Christmas tree is installed to the upper part of the housing. The gate is then laterally moved within the safety valve to a position where the vertical passage of the inner part of the insert completes the vertical flow path from the tubing in the wellhead below to the Christmas tree above the safety valve housing.

Where the gate includes a portion with a "T" shaped passage therein, the method further includes the step of moving the gate within the housing to prevent flow from the tubing to the upper passage of the housing and comprises the step of moving the gate laterally within the housing until the head passage of the "T" is aligned with the lateral outlets in the housing and the base passage of the "T" is aligned with the tubing below and a portion of the upper surface of the gate having no passage extending through it covers the flow path to the upper passage of the housing.

Alternatively, the method described above may include the step of laterally moving the gate until the lateral portion of the gate having no passage extending through it covers the lower passage of the housing such that flow from the tubing is prevented access to the upper passage of the housing.

A similar method is provided for the first embodiment of the invention where the gate does not have a vertical cavity and insert but rather has a first lateral position with a first gate vertical passage having a diameter substantially the same as the vertical passage and another portion with a second gate vertical passage having a diameter smaller than the first gate vertical passage and another portion either having no vertical passage therethrough or an "L" shaped passage or "T" shaped passage therethrough. Thus, the method using the valve according to this embodiment gains access to the tubing in the lower vertical housing passage via the first gate vertical passage of the first lateral portion.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIG. 9 illustrates a second embodiment of the invention wherein the gate has a removable insert provided in a vertical cavity of the gate;

FIGS. 11, 12 and 13 show gates which may be used in the valve according to the second embodiment of the invention and illustrating in exploded views the removable insert which may be inserted into the vertical cavities of gates there illustrated;

DESCRIPTION OF THE INVENTION

Figure 1:
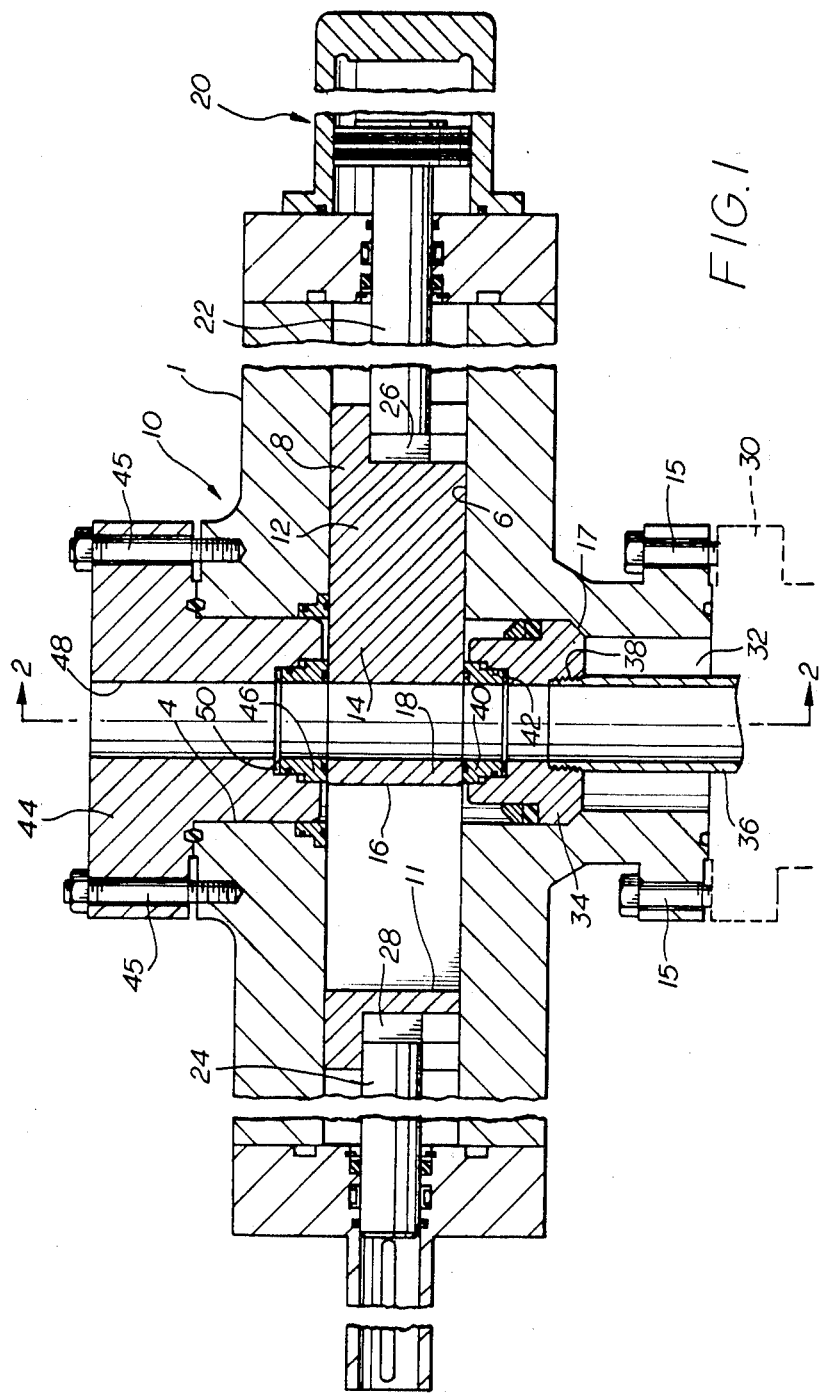
FIG. 1 is a cross-section through the valve according to a first embodiment of the invention.

FIG. 1 illustrates generally at 10 the valve according to a first embodiment of the invention. The valve has a housing 1 defining a vertical housing passage 4 and a lateral housing passage 6. Disposed in the lateral housing passage 6 is a gate 8 which may be laterally moved in the lateral housing 6 by a gate lateral moving means 20.

The moving means 20, which may be as illustrated a hydraulically driven piston, cooperates with rods 22 and 24 which are coupled to gate 8 by means of couplings 26 and 28.

Figure 3:
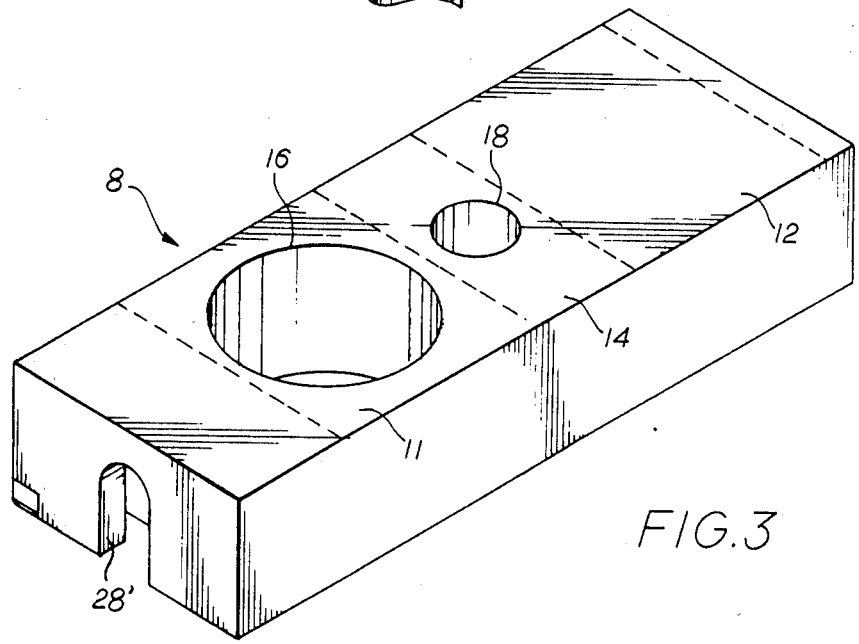
FIG. 3 is a perspective view of the gate of a first embodiment of the invention.

The gate 8, shown in cross-section of FIG. 1, is illustrated in a perspective view in FIG. 3 and shows a first gate vertical passage 16 in a first lateral portion of the gate 10. Although the first gate vertical passage is illustrated in FIG. 1 to be of the same diameter as the entire vertical housing passage 4, the first gate vertical passage 16 must be at least as large as that portion of the vertical housing passage 4 extending below the lateral housing passage 6. The upper part of the vertical housing passage above the lateral housing passage 6 may have the identical diameter or substantially the identical diameter of the first gate vertical passage or may be somewhat larger.

The relative dimensions discussed above are necessary such that apparatus to be landed in the lower part of the vertical housing passage 4 may have access through the upper part of the vertical housing passage 4 and the first gate vertical passage 16.

In a second lateral portion 12 of the gate 8, no vertical passage is provided as shown in FIGS. 1 and 3. In a third lateral portion 14 of the gate, a second gate vertical passage 18 is provided.

The housing 1 is shown schematically attached to a wellhead 30 by means of bolts 15. Tubing 36, attached by means of threaded surfaces 38 to a tubing hanger 34, is landed in the lower portion of the housing 1 by means of cooperating landing shoulders 17. Of course, the tubing hanger 34 could be landed within the wellhead 30, or in the housing 1 of the safety valve 10 as illustrated. The housing 1 of the valve could be fabricated with the housing of the wellhead 30 forming an integral housing.

A lower coupling member 40 is provided in cooperation with an upper portion of the tubing hanger 34. A spring 42 cooperating between upwardly and downwardly facing shoulders of the lower coupling member 40 and tubing hanger 34 is provided to urge the coupling member upwardly against gate 8 when a portion of the gate is moved into the vertical housing passage 4. In a similar way, an upper coupling member 46 is provided in cooperation with an adapter flange 44 and is urged downwardly by means of spring 50 cooperating with upwardly and downwardly facing shoulders of the adapter flange 44 and the upper coupling member 46. An upper conduit 48 is provided within the adapter flange 44. The adapter flange 44 may be connected to the housing 1 by means of threaded bolts 45.

Thus, the upper coupling member 46 and the lower coupling member 40 provide a fluid communication path from the tubing 36 extending into the wellhead 30 and the upper conduit 48 which may be provided in communication with a blowout preventer or a Christmas tree or the like to be described below.

In the configuration illustrated in FIG. 1, the adapter flange 44 is shown attached to the valve housing 1. Of course, before the adapter flange 44 is attached to the housing 1, the tubing hanger 34 has full-bore access through the vertical housing passage of the housing 1 of the valve 10 to the lower portion of the vertical housing passage below the lateral housing passage 6, via vertical passage 16 of gate 8.

It should be observed at this point that when the portion of the gate having no vertical passage in it is moved laterally to cover the lower coupling member 40, the upward fluid flow path from the tubing 36 is prevented. Thus, a blowout preventer may be attached to the housing 1 with the gate 8 and that portion 12 of the gate having no vertical passage in it providing complete shut-off for the valve and the resulting complete control over the well.

After the blowout preventer is attached to the housing 1, full-bore access through the bore of the blowout preventer is available for removing the tubing hanger 34 and tubing 36 and replacing it as in workover operations or during initial installation work on the well, the tubing hanger 34 and 36 may be initially placed in the well to the position as that illustrated in FIG. 1.

FIG. 1 illustrates the adapter flange 44 attached the valve housing 1, where the work has been done of landing the tubing hanger 34 and tubing 36 in the well and the well has been provided with the upper conduit 48 for vertical production of the well as will be discussed in more detail below. It should be further observed that the gate 8 in the position as illustrated in FIG. 1 has the second gate vertical passage 18 aligned with the tubing 36 in the vertical flow path provided by the lower coupling member 40, upper coupling member 46 and the upper conduit 46. In that condition, the safety valve provides vertical communication from the tubing 36 to equipment attached to the top of the well.

It should be also observed that the well can be completely closed off by further moving the gate 8 laterally to the left until the portion 12 of the gate having no vertical passage completely closes off the vertical flow path from the tubing 36. By the same token, the gate 8 may be moved laterally to the right removing the condition of complete shut-off with no damage done to any of the parts of the valve. Such a feature of the invention advantageously enables oilfield workers to feel free to close off a well under the slightest hint of danger caused by a kick or excess pressure coming from the well.

Figure 2:
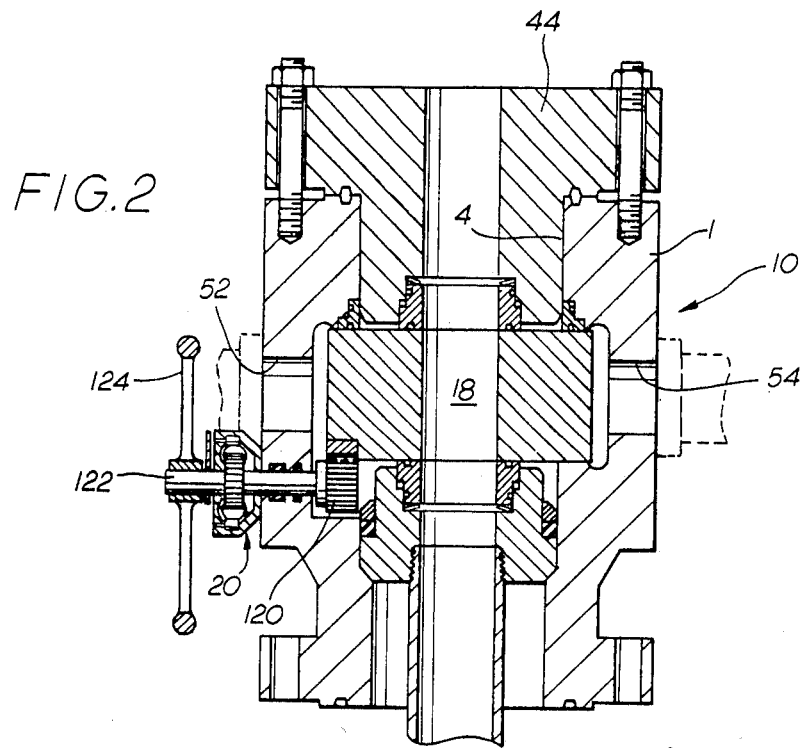
FIG. 2 is a cross-section of the valve taken through lines 2—2 along the center line of FIG. 1 and further illustrating side outlets and lateral moving means for moving the gate of the valve.

FIG. 2 illustrates the valve of FIG. 1 in a cross-section through line 2—2 of FIG. 1 and shows the condition of the valve where the second gate vertical passage 18 is in line with the vertical housing passage 4 in the housing 1. Further illustrated in FIG. 2 are lateral outlets 52 and 54 which are in communication with the inner section of the vertical housing passage 4 and the lateral housing passage 6. As will be illustrated with respect to later figures and discussion, the lateral outlets 52 and 54 cooperate with other passages which may be provided in the gate 8 for providing lateral diverting paths in the valve.

Also illustrated in FIG. 2 is an alternative lateral moving means 20' for moving the various lateral portions of the gate 8 into the intersection of the vertical housing passage 4 and the lateral housing passage 6. A shaft 122 is connected to a gear 120 for laterally moving gate 8 of FIG. 1. A handwheel 124 is attached to the shaft 122 to provide manual means for rotating the shaft and the gear to laterally move the gate 8 to the various operative positions. Hydraulic lateral moving means may also be provided, and an illustrative embodiment of such is presented below.

FIG. 3 previously discussed in connection with FIG. 1, shows one construction of the gate of the first embodiment of the invention with the large first gate vertical passage 16 having a diameter at least as large as the vertical housing passage 4 beneath the lateral housing passage 6. The second lateral portion 12 having no vertical passages is illustrated as well as the third lateral portion 14 having the second gate vertical passage 18. The diameter of the second gate vertical passage 18 is sized to cooperate with the lower coupling member 40 and the upper coupling member 46 illustrated in FIG. 1.

Figures 4, 5:
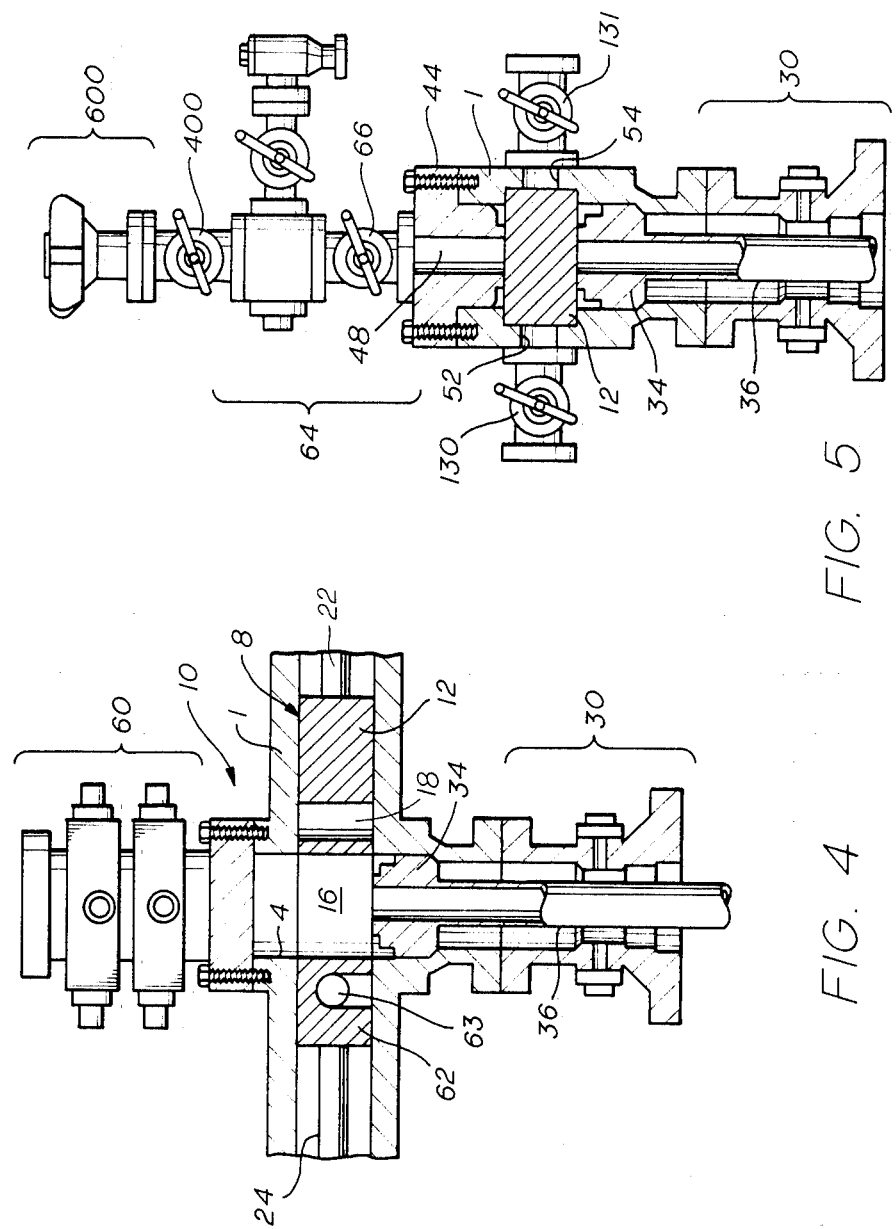
FIG. 4 is a schematic diagram of the valve of FIGS. 1-3 connected between a blowout preventer stack and a wellhead and illustrates a different gate configuration from that illustrated in FIG. 3.
FIG. 5 is a cross-section illustration taken at right angles through the center of the valve from that illustrated in FIG. 4 and further illustrates the attachment of a Christmas tree to the top of the valve and a swab valve and adapter for wireline work attached to the top of the Christmas tree.

FIG. 4 illustrates the valve 10, according to the first embodiment of the invention, connected between a wellhead 30 and a blowout preventer 60. A second construction of the gate 8 is illustrated having a fourth lateral portion 62 with an "L" or "T" shaped passage 63 provided to communicate with the first and/or second lateral outlets 52 and 54. As illustrated in FIG. 4, the gate 8 is in a lateral position such that the first gate vertical passage 16 is aligned with the vertical housing passage 4 of the housing 1. Thus, as mentioned above, the tubing hanger 34 with its tubing 36 may be inserted through the vertical flow path of the blowout preventer stack 60 and through the vertical housing passage 4 into landed engagement below the lateral housing passage 6. In addition to providing complete shut-off of the vertical fluid flow path from the tubing 36 by moving the gate 8 laterally to the left where the second lateral portion having no vertical passage 12 covers the tubing hanger 34, the gate 8 may be moved to the right whereby the "L" or "T" shaped passage 62 may provide a diverting path from the tubing 36 to either or both the first lateral outlet 52 and the second lateral outlet 54.

FIG. 5 illustrates the valve 10 in the condition after the tubing hanger 34 has been landed in the lower part of the vertical housing passage 4 and an adapter flange 44 with an upper conduit 48 has been provided and a Christmas tree 64 with a master valve 66 attached. The valve 10 is connected to a wellhead 30 as above and a swab valve 400 and an adapter 600 for connection of a lubricator is provided for establishing wireline work through the swab valve, Christmas tree, upper conduit 48 and into the tubing 36. As illustrated however, the portion of the gate 12 having no vertical outlet is shown preventing communication from the tubing 12. Thus, the gate 8 must be moved to allow vertical communication for wireline work.

Shown also in the illustration of FIG. 5 are wing or diverter valves 130 and 131 which may be connected to outlets 52 and 54, respectively so that when a "T" shaped passage 62 as that of the illustration of FIG. 4 is brought laterally in communication with the lateral valves 52 and 54, the fluid from the tubing 36 may be diverted from the well. Well control could be obtained by using the wing valves 130 and 131 and lateral conduits 52 and 54 as "kill" passages if the "L" or "T" shaped passage 62, illustrated in FIG. 4, were to be brought into communication with the tubing 36 and lateral passages 52 and 54 by laterally moving the gate 8 to the right from that illustrated in FIG. 4. Control fluid could then be pumped into the well to bring the well under control. Procedures such as circulation, bullheading, pressure relieving, in addition to killing could also be performed via the lateral passages and control valves prior to vertical reentry of the well.

Figure 6:
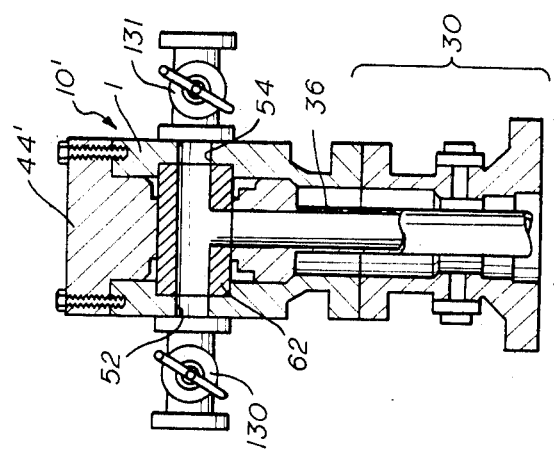
FIG. 6 illustrates the valve according to the invention used in a horizontal production tree configuration and illustrates a "T" shaped passage which may be provided in the gate illustrated in FIG. 3.

FIG. 6 illustrates the valve 10 in use as a master valve of a horizontal production tree 10'. In the illustration of FIG. 6, the portion 62 of the gate having a "T" shaped passage provides fluid communication between the tubing 36 and the lateral outlets 52 and 54. Thus, with the cap 44' connected to the housing 1 production of the well may be provided via the wing valves 130 and 131 serving as production control valves.

Figure 7:
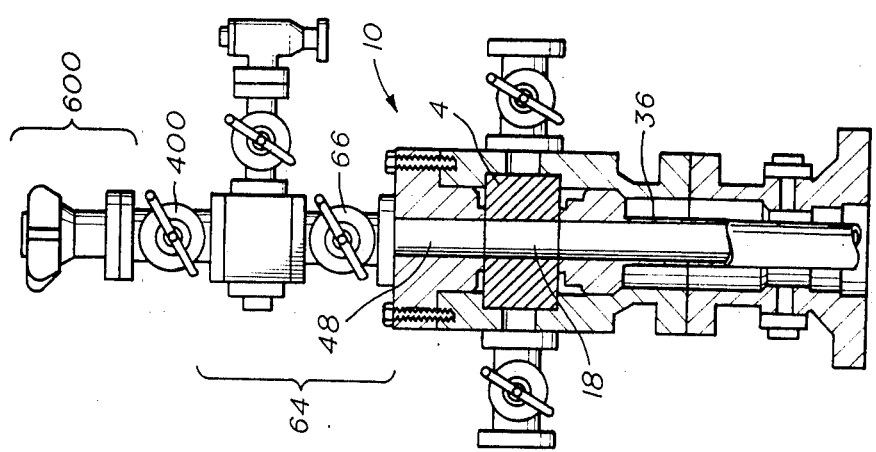
FIG. 7 illustrates the valve of FIG. 5 with the second vertical gate passage aligned with upper and lower conduits.

In another illustration of the valve 10 shown in FIG. 7, the second gate vertical passage 18 is shown in alignment with the production tubing 36 and the upper conduit 48 providing vertical communication to the Christmas tree 64, swab valve 400 and adapter 600.

Figure 8:
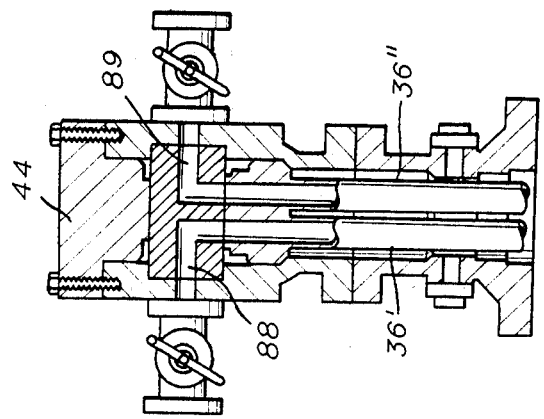
FIG. 8 illustrates still another element of the gate of FIG. 3 which may be provided according to the invention.

FIG. 8 illustrates still another possible configuration of the gate 8 where two "L" shaped passages 88 and 89 are in communication with two production tubings 36' and 36" landed by means of a tubing hanger in the lower portion of the vertical housing passage.

FIGS. 9 through 14 illustrate an alternative or second embodiment of the invention. FIG. 9 shows the alternative embodiment which is substantially the same as that illustrated in FIG. 1 with the exception that a gate 80 is provided within the lateral housing passage 6 of valve 100 which has as illustrated, for example, in FIGS. 11, 12 and 13, a vertical cavity 160 and a removable insert 150 having a vertical bore 140 through it.

FIGS. 11, 12 and 13 illustrate that various embodiments of the gate may be provided within the lateral housing passage 6 of the valve 100 illustrated in FIG. 9. The gate 80 illustrated in FIG. 9 is of the kind illustrated in FIGS. 12 and 13 where a first portion of the gate has the vertical cavity 160 and a second portion 12 of the gate has no bore or vertical passage through it. A third portion of the gate 130 has either a "T" shaped passage through it as illustrated in FIG. 13 or a single or a double "L" passage through it as illustrated in FIG. 12.

In the illustration of FIG. 9, the passage 620 may be either a "T" or an "L" or a double shaped passage within the portion of the gate 80 designated generally as 130. The valve 100 has a housing 101 with a lower vertical housing passage 402 and an upper vertical housing passage 400 coaxial with one another and forming an upwardly facing shoulder 501.

The upper vertical housing passage 400 has a larger diameter than that of the lower vertical housing passage 402 such that the insert 150 may be inserted via the upward vertical housing passage 400 into landed engagement on shoulder 501. The insert 150 has a downwardly facing shoulder 502 which cooperates with the upwardly facing shoulder 501 between the lower vertical housing passage 402 and the upper vertical passage 400. The lower part of the insert 150 has substantially the same diameter as the lower vertical housing passage and the upper part of the insert 150 has substantially the same diameter as the upper of the cavity 160. Of course, the vertical housing passage in the upper part of the housing 101 may be larger than the upper diameter of the cavity 160. The lower part of the cavity 160 may be larger than the diameter of the lower vertical housing passage below the lateral housing passage 6. Seals 170 are provided in the wall of the insert 150 to seal about the wall of the vertical cavity 160.

The illustration of FIG. 9 shows the gate 80 in a position where the vertical passage 140 in the insert 150 is aligned with the tubing 36 and the upper conduit 48 of adapter flange 44 via the lower coupling member 40 and the upper coupling member 46. The insert 150 may be removed from the gate 80 after the adapter flange 44 is removed from the housing 101. In a manner similar to that of the first embodiment of the invention discussed above, the gate 80 may be moved laterally to the left within the vertical housing passage 6 until the "T" or "L" shaped passage 620 is in alignment with the tubing 36 via the lower coupling member 40. Outlets 52, 54 in the housing, illustrated in FIG. 10, cooperate with the opening or openings in the side of the gate illustrated FIGS. 12 and 13 to communicate with such opening or openings.

The gate 80 may be moved still further to the left until that portion 120 of the gate completely covers the opening from the tubing 36 and lower coupling member 40 thereby completely shutting off the vertical flow path from the tubing 36 in the well.

Figure 10:
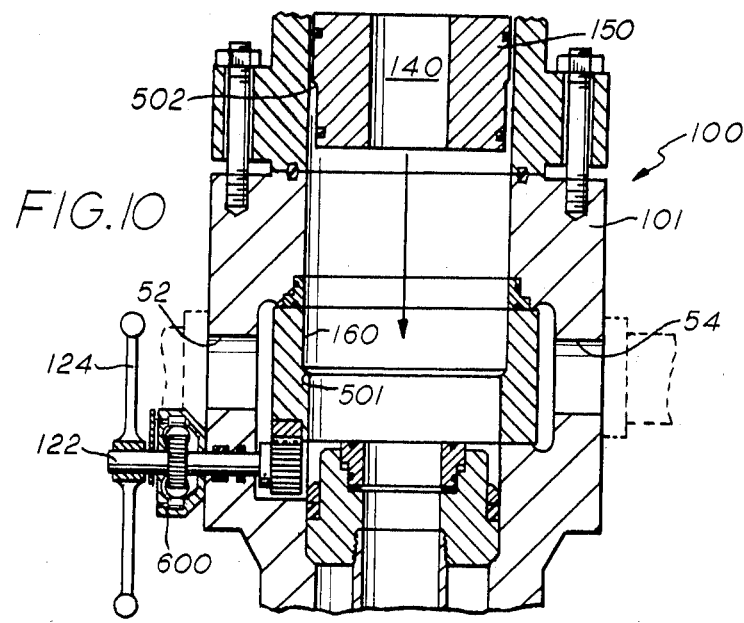
FIG. 10 illustrates in a cross-section along lines 10—10 of FIG. 9, the valve according to the invention.

FIG. 10 illustrates a vertical cross-section taken through section lines 10—10 of FIG. 9. This illustration of the second embodiment of the invention is similar to that of FIG. 2 showing the lateral outlets 52 and 54. Additionally illustrated is a hydraulic actuator means 600 which may be attached to the shaft 122 in addition to the handwheel 124. When the valve 100 is to be used as a safety valve, it may be advantageous to use a hydraulic actuating means 600 which may be remotely operated to drive the gate 80 to complete shut-off or to the divert mode via a "T" or "L" shaped passage 620. In normal operation, however, the manual operation of the valve 124 would serve to position the gate 80 among the various modes of the valve 100. The illustration of FIG. 10 shows the condition of the valve 100 where the insert 150 is being either removed or inserted within the cavity 160 in the housing 101.

FIGS. 11, 12 and 13 show the configurations of gate 80 which maybe used in the lateral housing passage of valve 100. FIG. 11 shows a configuration having a vertical cavity 160 in which the insert 150 is landed and held in the gate 80' by means of cooperating shoulders 501 and 502.

In the illustration of FIG. 11 there are but two lateral portions of the gate 80': a first portion 110 in which the vertical cavity 160 is provided and a second portion 120 having no vertical passage through it. The configuration of FIG. 11 has no means for diverting fluid flow from the lower vertical housing passage via the side of the valve as shown, for example, in FIG. 10 with outlets 52 and 54. With the gate 80' of the FIG. 11 there is a means of completely closing off the vertical flow path between the lower vertical passage 402 and the upper vertical housing passage 400. When the first portion 110 of the gate 80 is aligned with the lower vertical housing passage 402 and the insert 150 is inserted within the cavity 160, vertical flow via the passage 140 and the insert 150 is provided by the valve.

FIG. 12 shows another configuration of the gate, designated as 80". It is similar to that of FIG. 11 except that the third lateral portion 130 of the gate 80" has formed therein two "L" shaped passages 200 and 201. Such passages may find application for a dual production tubing completion as illustrated in FIG. 8 for the first embodiment of the invention whereby production via the wing valves may be accomplished.

FIG. 13 shows a similar gate to that illustrated in FIG. 12 wherein gate 80''' includes a "T" shaped passage 620 in the third lateral portion 130 of the gate.

Figure 14:
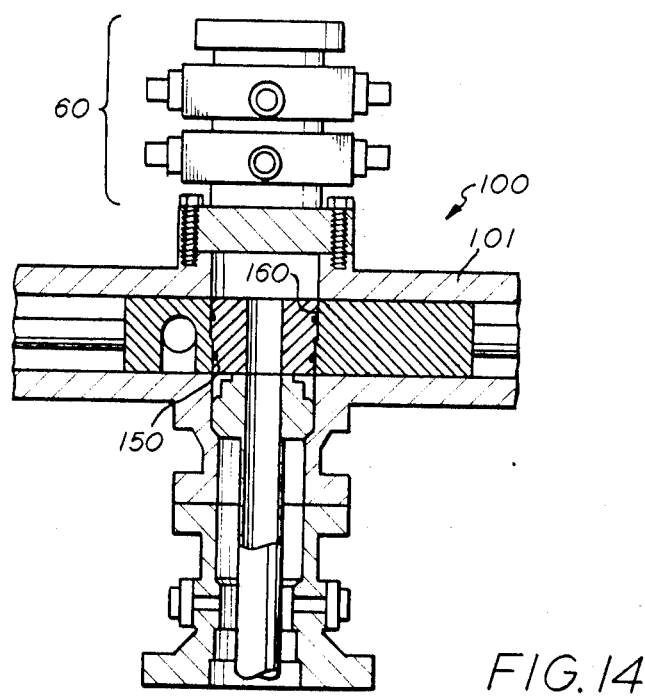
FIG. 14 shows the valve according to the second embodiment of the invention after a insert has been provided into the vertical cavity of the gate through a blowout preventer stack.

FIG. 14 shows the valve 100 in a configuration where a blowout preventer stack 60 is attached to the top of the valve as was illustrated in FIG. 4 for the first embodiment of the invention. FIG. 14 illustrates that the insert 150 may be conveniently landed within the cavity 160 of the housing 101.

Figure 15:
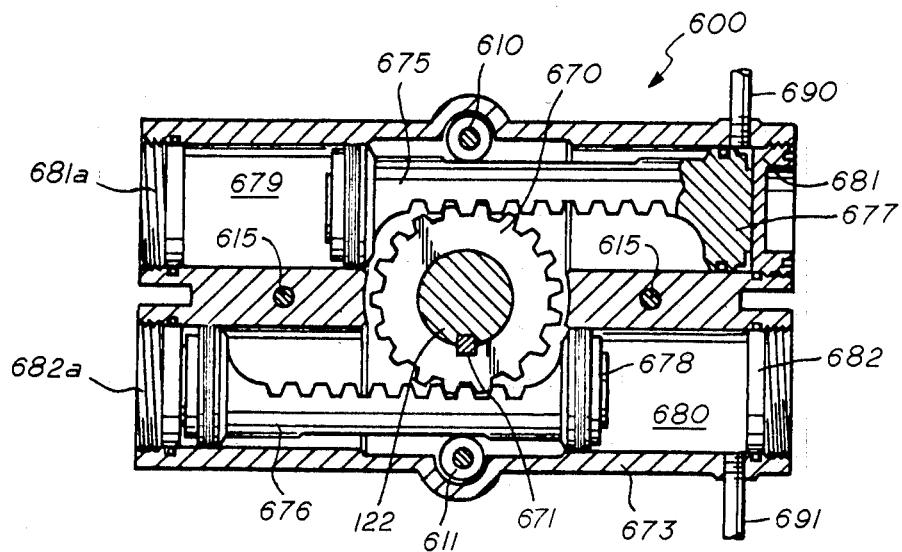
FIG. 15 illustrates a hydraulic actuator mechanism for laterally moving the gate of the valve according to the invention.

FIG. 15 illustrates the hydraulic actuator 600 of FIG. 10. A pinion gear 670 is provided about the gate stem actuator 122 and is held thereto by means of a key 671. Gear 670 is carried within the housing 673 which may be bolted to the valve body 101 so as to be removable therefrom and from the gear 120 illustrated in FIG. 10.

Disposed within the housing 673 are upper and lower racks 675 and 676 meshing with the pinion gear 670 and integral with the pistons 677 and 678. The pistons are reciprocal horizontally within the cylinders 679 and 680 formed within and by the housing structure as illustrated there being end caps 681 and 682 closing the cylinders at their heads as fluid pressure is admitted via port 690 to drive piston 677 to the left.

As illustrated in FIG. 15, the pinion gear 670 and valve stem 122 are rotated by rack 675 and drives rack 676 and piston 678 to the right thereby exhausting fluid from the space between piston 678 and end cap 682 via port 691. The hydraulic motive means illustrated in FIG. 15 is adapted primarily for emergency purposes; that is, when it is desired to quickly and remotely shut-off fluid from the lower passage 32 of the valve 10 illustrated in FIG. 1. For example, it is desired to be able to move the gate until a portion of the gate having no vertical passage therethrough may seal about the upper coupling member 40 provided in communication with any tubing disposed below in the wellhead.

Therefore, the hydraulic actuator depicted in FIG. 15 is constructed such that caps 681 and 682 limit turning of the stem and movement of the gate to a degree such that the valve may be quickly and remotely turned to a full off or safety position. On the other hand, it is desired that the gate may be moved to other positions allowing for either vertical or horizontal communication with tubing in the wellhead. Therefore, the portion of the cylinders to the left of the pinion gear 670 are constructed with end caps 681a and 682a allowing the gate to be moved in the opposite direction. The hydraulic actuator being primarily for emergency safety operation of the valve, a mechanical handwheel 124 is also provided as previously described about the valve stem 122 (see FIG. 10) for mechanically turning the valve to various positions.

Figure 16:
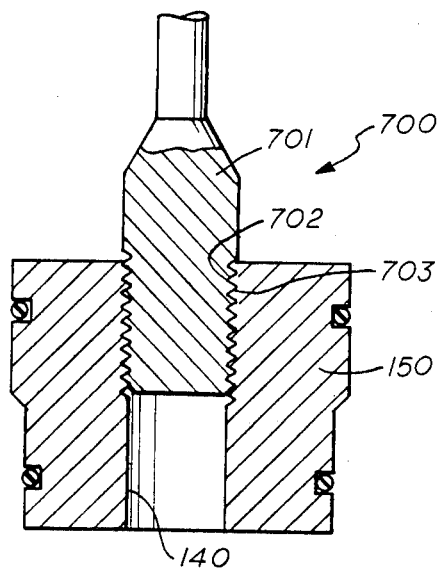
FIG. 16 illustrates a tool for inserting or removing the insert in the vertical gate cavity of the second embodiment of the invention.

FIG. 16 illustrates a means for inserting the insert 150 within the cavity 160 of gate 80 (or gate 80', 80" or 80'''). Insertion is performed by means of the tool 701 which has threads 702 formed about its external surface. Complementary threads 703 in the interior of the vertical passage 140 of the insert 150 may be used to threadedly secure tool 701 to the insert 150. Thus, the tool 701 may be attached to the insert 150 by means of the cooperating threads 702 and 703 and may be used to land the insert 150 within the cavity 160. By turning the tool 701 to disengage the threads 702 and 703, the tool 701 may be withdrawn leaving the insert 150 within the cavity 160. The reverse of the procedure described above may be used to withdraw the insert 150 from the cavity 160.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting for the embodiments and is to be interpreted as illustrative and not limitative.

What is claimed is:

1. A valve comprising,
   a housing having a vertical housing passage and a lateral housing passage, said vertical and lateral passages intersecting each other,
   a laterally movable gate disposed in said lateral passage, said gate having
      a first lateral portion with a first gate vertical passage having a diameter substantially the same as or less than the vertical housing passage,
      a second lateral portion having no vertical passage therethrough, and
      a third lateral portion with a second gate vertical passage having a diameter smaller than said first gate vertical passage,
   means for laterally moving said gate in said lateral housing passage between at least two positions:
   the first position where said gate is in a lateral position such that said first gate vertical passage is aligned with said vertical housing passage and full diameter access through the vertical housing and the first gate vertical passage is provided, and
   the second position where said gate is in a second lateral position such that said second lateral portion of said gate is aligned with said vertical housing passage and the vertical flow path through the vertical housing passage is closed.

2. The valve of claim 1 further comprising,
   means for disposing upper and lower conduits in said vertical housing passage, the upper conduit having its lower end open to the intersecting lateral passage, the lower conduit having its upper end open to the intersecting lateral passage and is insertable through said first gate vertical passage when said first gate is in said first position, and
   the lateral moving means is adapted to move said gate among said two positions and a third position:
   the third position where said gate is in a lateral position such that said second gate vertical passage is aligned with the open lower end of the upper conduit and the open upper end of the lower conduit.

3. The valve of claim 2 further comprising, at least one lateral outlet in said housing, said lateral outlet being substantially perpendicular to said vertical housing passage and to said lateral housing passage and being open to the intersection of the lateral housing passage and the vertical housing passage, and the gate further having,
- a fourth lateral portion with a gate "L" shaped passage therein, the "L" shaped passage having an opening in the bottom of the gate and an opening in a side portion of the gate, the lateral moving means being adapted to move said gate among said three positions and a fourth position:

the fourth position where said gate is in a lateral position such that said gate "L" shaped passage has its opening in the bottom of the gate aligned with the upper end of the lower conduit in the vertical housing passage and its opening in the side portion of the gate aligned with the lateral outlet in said housing.

4. The valve of claim 2 further comprising,
two lateral outlets in said housing, said lateral outlets being substantially perpendicular to said vertical housing passage and to said lateral housing passage, each of the outlets being open to the intersection of the lateral housing passage and the vertical housing passage, and the gate further having,
- a fourth lateral portion with a gate "T" shaped passage therein, the "T" shaped passage having a base passage with an opening in the bottom of the gate and a head passage intersecting the base passage and having openings in the sides of the gate, and the lateral moving means is adapted to move said gate among said three positions and a fourth position:

the fourth position where said gate is in a lateral position such that said gate "T" shaped passage has its opening in the bottom of the gate aligned with the upper end of the lower conduit in the vertical housing passage and its openings in the sides of the gate aligned with the respective lateral outlets in the housing.

5. The valve of claim 4 further comprising
two diverter valves, one each attached to each of the two lateral outlets.

6. The valve of claim 3 further comprising,
a diverter valve attached to the lateral outlet.

7. A valve comprising,
a housing having coaxial upper and lower vertical housing passages and a lateral housing passage, said lateral passage intersecting said upper vertical housing passage and said lower housing passage and at least one lateral outlet in said housing, said lateral outlet being substantially perpendicular to said vertical housing passage and to said lateral housing passage and being open to the intersection of the lateral housing passage and the vertical housing passage, a laterally movable gate disposed in said lateral passage, said gate having
- a first lateral portion with a gate vertical passage having a diameter substantially the same as or less than the upper vertical housing passage,
- a second lateral portion with a second gate vertical passage having a diameter smaller than said first gate vertical passage, and
- a third lateral portion with a gate "L" shaped passage therein, the "L" shaped passage having an opening in the bottom of the gate and an opening in a side portion of the gate, whereby, when said gate is in a lateral position where said first gate vertical passage is aligned with said vertical housing passage, full diameter access through the vertical housing passage and the first vertical passage is provided.

8. The valve of claim 7 further comprising
means for disposing upper and lower conduits in said vertical housing passage, the upper conduit having its lower end open to the intersecting lateral passage, the lower conduit having its upper end open to the intersecting lateral passage, means for laterally moving said gate in said lateral housing passage between at least two positions:

the first position where said gate is in a lateral position such that said first gate vertical passage is aligned with said vertical housing passage and full diameter access through the vertical housing and the first gate vertical passage is provided, and the second position where said gate is in a lateral position such that said second gate vertical passage is aligned with the open lower end of the upper conduit and the open upper end of the lower conduit.

9. The valve of claim 8 wherein
the lateral moving means is adapted to move the gate among the two positions and a third position:

the third position where said gate is in a lateral position such that said gate "L" shaped passage has its opening in the bottom of the gate aligned with the upper end of the lower conduit in the vertical housing passage and its opening in the side portion of the gate aligned with the lateral outlet in said housing.

10. The valve of claim 9 further comprising,
a diverter valve attached to the lateral outlet.

11. The valve of claim 9 further comprising,
means for cutting a wireline extending through said upper and lower vertical passages and through said second gate vertical passage upon moving said gate from said second position to said third position.

12. A valve comprising,
a housing having coaxial upper and lower vertical housing passages and a lateral housing passage, said lateral passage intersecting said upper vertical housing passage and said lower housing passage, a laterally movable gate disposed in said lateral passage, said gate having
- a first lateral portion with a first gate vertical insert cavity, the insert cavity having an inner diameter substantially the same as or less than that of the upper vertical housing passage, and
- a removable inner part disposed in said insert cavity having an outer diameter substantially the same as that of the insert cavity and having a vertical passage, whereby when said vertical insert cavity of said first lateral portion of said gate is aligned with said upper and lower vertical housing passages, said removable inner part may be removed from or inserted in the insert cavity via the upper vertical housing passage.

13. The valve of claim 12 further comprising
means for laterally moving said gate in said lateral housing passage between at least two positions:

the first position where the vertical passage of the inner part is aligned with the upper and lower vertical housing passages allowing fluid communication between the upper and lower passages of the housing, and the second position where a second lateral portion of the gate having no passage extending through it covers the lower housing passage, thereby closing the flow path from the lower passage to the upper passage of the housing.

14. The valve of claim 13 further comprising
means for disposing upper and lower conduits, respectively, in said upper and lower vertical housing passages, the upper conduit having its lower end open to the intersecting lateral passage, the lower conduit having its upper end open to the intersecting lateral passage, and
whereby in the first position, said inner part is aligned with the upper and lower conduits allowing fluid communication therebetween.

15. The valve of claim 18 further comprising
at least one lateral outlet in said housing, said lateral outlet being substantially perpendicular to said vertical housing passage and to said lateral housing passage and being open to the intersection of the lateral housing passage and the vertical housing passage, and
the gate further having,
a third lateral portion with a gate "L" shaped passage therein, the "L" shaped passage having an opening in the bottom of the gate and an opening in a side portion of the gate,
the lateral moving means being adapted to move said gate among said first and second positions and a third position:
the third position where said gate is in a lateral position such that said "L" shaped passage has its opening in the bottom of the gate aligned with the upper end of the lower conduit in the vertical housing passage and its opening in the side of the gate aligned with the lateral outlet in said housing.

16. The valve of claim 15 further comprising,
a diverter valve attached to the lateral outlet.

17. The valve of claim 14 further comprising
two lateral outlets in said housing, said lateral outlets being substantially perpendicular to said vertical housing passage and to said lateral housing passage, each of the outlets being open to the intersection of the lateral housing passage and the vertical housing passage,
the gate further having
a third lateral portion with a gate "T" shaped passage therein, the "T" shaped passage having a base passage with an opening in the bottom of the gate and a head passage intersecting the base passage and having openings in the sides of the gate,
the lateral moving means being adapted to move said gate among said first and second positions and a third position:
the third position where said gate is in a lateral position such that said gate "T" shaped passage has its opening in the bottom of the gate aligned with the upper end of the lower conduit in the vertical housing passage and its openings in the sides of the gate aligned with the respective lateral outlets in the housing.

18. The valve of claim 17 further comprising
two diverter valves, one each attached to each of the two lateral outlets.

19. A valve comprising,
a housing having coaxial upper and lower vertical housing passages and a lateral housing passage, said lateral passage intersecting said upper vertical housing passage and said lower housing passage and at least one lateral outlet in said housing, said lateral outlet being substantially perpendicular to said vertical housing passage and to said lateral housing passage and being open to the intersection of the lateral housing passage and the vertical housing passage,
a laterally movable gate disposed in said lateral passage, said gate having
a first lateral portion with a first gate vertical insert cavity, the insert cavity having an inner diameter substantially the same as or less than that of the upper vertical housing passage, and
a removable inner part disposed in said insert cavity and having a vertical passage, whereby
when said vertical insert cavity of said first lateral portion of said gate is aligned with said upper and lower vertical housing passages, said removable inner part may be removed from or inserted in the insert cavity via the upper vertical housing passage,
a second lateral portion with a gate "L" shaped passage therein, the "L" shaped passage having an opening in the bottom of the gate and an opening in a side portion of the gate, and
means for laterally moving said gate in said lateral housing passage between at least two positions:
the first position where the vertical passage of the inner part is aligned with the upper and lower vertical housing passages allowing fluid communication between the upper and lower passages of the housing, and
the second position where said gate is in a lateral position such that said "L" shaped passage has its opening in the bottom of the gate aligned with the upper end of the lower conduit in the vertical housing passage and its opening in the side of the gate aligned with the lateral outlet in said housing.

20. The valve of claim 19 further comprising,
means for disposing upper and lower conduits, respectively, in said upper and lower vertical housing passages, the upper conduit having its lower end open to the intersecting lateral passage, the lower conduit having its upper end open to the intersecting lateral passage, and
whereby in the first position, said inner part is aligned with the upper and lower conduits allowing fluid communication therebetween.

21. The valve of claim 20 further comprising
a diverter valve attached to the later outlet.

22. A production tree for connection to the tubing head of an oil and gas well comprising,
a master valve adapted for connection to said tubing head of the well having,
a housing having coaxial upper and lower vertical housing passages and a lateral housing passage, said lateral passage intersecting said upper vertical housing passage and said lower housing passage, and at least one lateral outlet in said housing, said lateral outlet being being substantially perpendicular to said vertical housing passage and to said lateral housing passage and being open to the intersection of the lateral housing passage and to the vertical housing passage, and a laterally movable gate disposed in said lateral passage, said gate having a first lateral portion with a first gate vertical insert cavity, the insert cavity having an inner diameter substantially the same as or less than that of the upper vertical housing passage, a removable inner part removably disposed via said upper vertical housing passage in said insert cavity having an outer diameter substantially the same as that of the insert cavity and having a vertical passage, means for coupling production tubing landed in said tubing head with the lower housing passage of said master valve, a second lateral portion in said gate with a gate "L" shaped passage therein, the "L" shaped passage having an opening in the bottom of the gate and an opening in a side portion of the gate, means for laterally moving said gate in said lateral housing passage, and control valve means attached to said lateral outlet for controlling fluid flow in the production tubing in the well.

23. The control valve of claim 22 further comprising a third lateral portion of the gate having no passage through it.

24. The production tree of claim 22 further comprising, means for attaching a blowout preventer to the upper passage of said housing, whereby control over the well is maintained during removal of said inner part of said gate during workover operations.

25. The production tree of claim 22 further comprising, means for capping said upper passage of said housing.

26. A production tree for connection to the tubing head of an oil and gas well comprising a master valve adapted for connection to said tubing head of the well having, a housing having coaxial upper and lower vertical housing passage and a lateral housing passage, said lateral passage intersecting said upper vertical housing passage and said lower housing passage, and two lateral outlets in said housing, said lateral outlets being substantially perpendicular to said vertical housing passage and to said lateral housing passage and being open to the intersection of the lateral housing passage and to the vertical housing passage, and a laterally movable gate disposed in said lateral passage, said gate having a first lateral portion with a first gate vertical insert cavity, the insert cavity having an inner diameter substantially the same as or less than that of the upper vertical housing passage, a removable inner part removably disposed via said upper vertical housing passage in said insert cavity having an outer diameter substantially the same as that of the insert cavity and having a vertical passage, means for coupling production tubing landed in said tubing head with the lower housing passage of said master valve, and a second lateral portion in said gate with a gate "T" shaped passage therein, the "T" shaped passage having a base passage with an opening in the bottom of the gate and a head passage intersecting the base passage and having openings in the sides of the gate, means for laterally moving said gate in said lateral housing passage, and control valve means attached to said lateral outlets for controlling fluid flow in the production tubing in the well.

27. The production tree of claim 26 further comprising a third lateral portion of the gate having no passage extending through it.

28. The production tree of claim 26 further comprising, means for attaching a blowout preventer to the upper passage of said housing, whereby control over the well is maintained during removal of said inner part of said gate during workover operations.

29. The production tree of claim 26 further comprising, means for capping said upper passage of said housing.

30. The safety valve of claim 26 further comprising two diverter valves, one each attached to each of the two lateral outlets.

31. A safety valve adapted for controlling a well and adapted for placement between a tubing head and a blowout preventer stack or a production tree comprising, a housing having coaxial upper and lower vertical housing passages and a lateral housing passage, said lateral passage intersecting said upper vertical housing passage and said lower housing passage, and two lateral outlets in said housing, said lateral outlets being substantially perpendicular to said vertical housing passage and to said lateral housing passage, each of the outlets being open to the intersection of the lateral housing passage and the vertical housing passage, means for disposing upper and lower conduits, respectively, in said upper and lower vertical housing passages, the upper conduit having its lower end open to the intersecting lateral passage, the lower conduit having its upper end open to the intersecting lateral passage, a laterally movable gate disposed in said lateral housing, said gate having a first lateral portion with a first gate vertical insert cavity, the insert cavity having an inner diameter substantially the same as or less than that of the upper vertical housing passage, a removable inner part removably disposed via said upper vertical housing passage in said insert cavity having an outer diameter substantially the same as that of the insert cavity and having a vertical passage, a second lateral portion of the gate having no passage extending through it, and a third lateral portion of the gate with a gate "T" shaped passage therein, the "T" shaped passage having a base passage with an opening in the bottom of the gate and a head passage intersecting the base passage and having openings in the sides of the gate, means for laterally moving said gate in said lateral housing passage among at least three positions:
the first position where the vertical passage of the inner part is aligned with the upper and lower vertical housing passages allowing fluid communication between upper and lower passages of the housing, and
the second position where a second lateral portion of the gate having no passage extending through it covers the lower housing passage thereby closing the flow path from the lower passage to the upper passage of the housing, and
the third position where said gate is in a lateral position such that said gate "T" shaped passage has its opening in the bottom of the gate aligned with the upper end of the lower conduit in the vertical housing passage and its openings in the sides of the gate aligned with the respective lateral outlets in the housing.

32. In a well having a wellhead to which is attached a safety valve housing having an upper passage and a lower passage, the lower passage communicating with the wellhead, and each of the upper and lower passages being open to a lateral passage in the housing, a laterally movable gate disposed in said lateral passage, the gate having a first lateral portion with a first gate vertical insert cavity, the insert cavity having an inner diameter substantially the same as or less than that of the upper vertical housing passage and a removable inner part disposed in said insert cavity having an outer diameter substantially the same as that of the insert cavity and having a vertical passage therethrough, the housing having a blowout preventer removably attached to the upper part of the housing with vertical flow path of the blowout preventer communicating with the upper passage of the safety valve, the diameter of the vertical flow path of the blowout preventer being substantially the same as or greater than that of the upper passage of the safety valve, the inner diameter of the insert cavity and the lower passage,
a method for controlling the well during installation of production tubing and a Christmas tree comprising the steps of,
setting tubing in the well through the blowout preventer and the upper passage, the insert cavity of the first lateral portion of the gate, and the lower passage of the safety valve housing,
installing an inner part of the gate within the vertical insert cavity of the first lateral portion of the gate, the inner part having an outer diameter substantially the same as that of the insert cavity of the first lateral portion,
laterally moving said gate within the safety valve housing until flow form the tubing is prevented access to the upper passage of the housing,
removing the blowout preventer from the upper part of the housing,
installing a Christmas tree to the upper part of the housing, and
laterally moving the gate within the safety valve to a position where the vertical passage of the inner part completes the vertical flow path from the tubing in the wellhead below to the Christmas tree above the safety valve housing.

33. The method of claim 32 wherein the gate further includes a portion with a "T" shaped passage therein, the "T" shaped passage having a base passage with an opening in the bottom of the gate and a head passage intersecting the base passage and having openings in the sides of the gate, the housing having two lateral outlets being substantially perpendicular to said upper and lower passage and to said lateral housing passage, each of the outlets being open to the intersection of the lateral housing passage and said upper and lower passages, and a diverter valve being attached to each of said outlets, and
the step of moving the gate within the housing to prevent flow from the tubing to the upper passage of the housing comprises
moving the gate laterally within the housing until the head passage of the "T" is aligned with said lateral outlets of the housing and said base passage of the "T" is aligned with said tubing, and a portion of the upper surface of the gate having no passage extending through it covers the flow path to the upper passage of the housing.

34. The method of claim 33 further comprising the step of opening one or both of the diverter valves whereby fluid in said tubing may be diverted away from said wellhead.

35. The method of claim 33 further comprising the step of
laterally moving said gate until the lateral portion of the gate having no passage extending through it covers the lower passage of the housing such that flow from the tubing is prevented access to the upper passage of the housing.

36. In a well having a wellhead to which is attached a safety valve housing having an upper passage and a lower passage, the lower passage communicating with the wellhead, and each of the upper and lower passages being open to a lateral passage in the housing, a laterally movable gate disposed in said lateral passage, the gate having a first lateral portion with a first gate vertical passage having a diameter substantially the same as or less than the vertical housing passage, and a second lateral portion with a second gate vertical passage having a diameter smaller than said first gate vertical passage, the housing having a blowout preventer removably attached to the upper part of the housing with the vertical flow path of the blowout preventer communicating with the upper passage of the safety valve, the diameter of the vertical flow path of the blowout preventer being substantially the same as or greater than that of the upper passage of the safety valve, the inner diameter of the insert cavity and the lower passage,
a method for controlling the well during installation of production tubing and a Christmas tree comprising the steps of,
setting tubing in the well through the blowout preventer and the upper passage, the first gate vertical passage and the lower passage of the safety valve,
laterally moving said gate within the safety valve housing until flow from the tubing is prevented access to the upper passage of the housing,
removing the blowout preventer from the upper part of the housing,
installing a Christmas tree to the upper part of the housing, and
laterally moving the gate within the safety valve to a position where the second gate vertical passage completes the vertical flow path from the tubing in the wellhead below to the Christmas tree above the safety valve housing.

37. A gate adapted for use in a valve housing with a vertical housing passage and a lateral housing passage, said vertical and lateral passages intersecting each other, and at least one lateral outlet in said housing, said lateral outlet being substantially perpendicular to said vertical housing passage and to said lateral housing passage and being open to the intersection of the lateral housing passage and the vertical housing passage, the gate comprising,
- a first lateral portion with a first gate vertical passage having a diameter substantially the same as the vertical housing passage,
- a second lateral portion with a second vertical passage having a diameter smaller than said first gate vertical passage, and
- a third lateral portion with a gate "L" shaped passage therein, the "L" shaped passage having an opening in the bottom of the gate and an opening in a side portion of the gate,
- said gate being adapted to be laterally movable within said lateral housing passage.

38. The gate of claim 37 further comprising
a fourth lateral portion having no vertical passage therethrough.

39. A gate adapted for use in a valve housing with a vertical housing passage and a lateral housing passage, said vertical and lateral passages intersecting each other, and two lateral outlets in said housing, said lateral outlets being substantially perpendicular to said vertical housing passage and to said lateral housing passage, each of the outlets being open to the intersection of the lateral housing passage and the vertical housing passage, the gate comprising,
- a first lateral portion with a first gate vertical passage having a diameter substantially the same as the vertical housing passage,
- a second lateral portion with a second vertical passage having a diameter smaller than said first gate vertical passage, and
- a third lateral portion with a gate "T" shaped passage therein, the "T" shaped passage having a base passage within an opening in the bottom of the gate and a head passage intersecting the base passage and having openings in the sides of the gate,
- said gate being adapted to be laterally movable within said lateral housing passage.

40. The gate of claim 39 further comprising
a fourth lateral portion having no vertical passage therethrough.

41. A gate adapted for use in a valve housing, the housing having coaxial upper and lower vertical housing passages and lateral housing passage, said lateral passage intersecting said upper and lower housing passages, and at least one lateral outlet in said housing, said later outlet being substantially perpendicular to said vertical housing passage and to said lateral housing passage and being open to the intersection of the lateral housing passage and the vertical housing passage, the gate comprising,
- a first lateral portion with a first vertical insert cavity, the insert cavity having an inner diameter substantially the same as or less than that of the upper vertical housing passage, and
- a removable inner part removably disposed via said upper vertical housing passage in said insert cavity having an outer diameter substantially the same as that of the insert cavity and having a vertical passage therein, and
- a second lateral portion with a gate "L" shaped passage therein, the "L" shaped passage having an opening in the bottom of the gate and an opening in a side portion of the gate,
- said gate being adapted to be laterally movable within said lateral housing passage.

42. The gate of claim 41 further comprising
a third lateral portion having no vertical passage therethrough.

43. A gate adapted for use in a valve housing, the housing having coaxial upper and lower vertical housing passages and a lateral housing passage, said lateral passage intersecting said upper and lower housing passages, and two lateral outlets in said housing, said lateral housing passages being substantially perpendicular to said vertical housing passage and to said lateral housing passage and being open to the intersection of the lateral housing passage and the vertical housing passage, the gate comprising,
- a first lateral portion with a first vertical insert cavity, the insert cavity having an inner diameter substantially the same as or less than that of the upper vertical housing passage, and
- a removable inner part removably disposed via said upper vertical housing passage in said insert cavity having an outer diameter substantially the same as that of the insert cavity and having a vertical passage therein, and
- a second lateral portion with a gate "T" shaped passage therein, the "T" shaped passage having a base passage with an opening in the bottom of the gate and a head passage intersecting the base passage and having openings in the sides of the gate,
- said gate being adapted to be laterally movable within said lateral housing passage.

44. The gate of claim 43 further comprising
a third lateral portion having no vertical passage therethrough.

* * * * *